United States Patent [19]
Müller

[11] 4,240,014
[45] Dec. 16, 1980

[54] PRECISION MOTOR SPEED CONTROL SYSTEM

[75] Inventor: Rolf Müller, St. Georgen, Fed. Rep. of Germany

[73] Assignee: Papst-Motoren KG, St. Georgen, Fed. Rep. of Germany

[21] Appl. No.: 964,373

[22] Filed: Nov. 28, 1978

[30] Foreign Application Priority Data

Dec. 12, 1977 [DE] Fed. Rep. of Germany ....... 2755343

[51] Int. Cl.³ ............................................. H02P 5/16
[52] U.S. Cl. .................................. 318/328; 318/314; 318/318
[58] Field of Search ............... 318/313, 314, 318, 326, 318/327, 328

[56] References Cited

U.S. PATENT DOCUMENTS

| | | | |
|---|---|---|---|
| 3,740,633 | 6/1973 | Buttafava | 318/328 |
| 3,864,610 | 2/1975 | Kawamoto et al. | 318/317 |
| 3,952,237 | 4/1976 | Kimizuka | 318/314 |
| 3,983,316 | 9/1976 | Schopp | 318/314 |
| 4,015,180 | 3/1977 | Tetsugu et al. | 318/314 |
| 4,079,942 | 3/1978 | Kunen | 318/313 |

FOREIGN PATENT DOCUMENTS

| | | |
|---|---|---|
| 1254740 | 3/1968 | Fed. Rep. of Germany . |
| 2161223 | 6/1973 | Fed. Rep. of Germany . |
| 2716670 | 10/1977 | Fed. Rep. of Germany . |
| 1123992 | 8/1968 | United Kingdom . |
| 1245648 | 9/1971 | United Kingdom . |
| 1400521 | 7/1975 | United Kingdom . |
| 1481063 | 7/1977 | United Kingdom . |

*Primary Examiner*—David Smith, Jr.
*Attorney, Agent, or Firm*—Frishauf, Holtz, Goodman, Woodward

[57] ABSTRACT

The invention provides for a high dynamic performance of a frequency-voltage converter with minimum delay from frequency into voltage. Especially to provide for highly accurate maintenance of speed i.e. a fast control performance of a motor, a pulse train is derived upon operation of the motor in the form of recurring needle trigger pulses. A command pulse train is derived having pulse gaps which are longer than the trigger pulses and spaced from each other so that, if the speed of the motor is at the correct level, the trigger pulses will fall within the pulse gaps. During the time interval ΔT between the end of a preceding command pulse $T_s$ and the next subsequent trigger pulse $T_i$, a capacitor 22 is charged, the charge state of which will provide a control signal to control the supply of energy to the motor which, through a transducer, provides the speed-dependent trigger pulses.

27 Claims, 14 Drawing Figures

PRECISION MOTOR SPEED CONTROL SYSTEM

REFERENCE TO RELATED PUBLICATIONS

U.S. Pat. No. 3,754,175; U.S. Pat. No. 4,119,895 (MULLER) German Disclosure Document DE-OS26 08 611 German Disclosure Document DE-OS 24 24 290

The present invention relates to a motor speed control system in which a control signal is produced whose magnitude is representative of the deviation of motor speed from a desired or commanded value, and more particularly to a system wherein the control signal is a function of the time difference between the pulse gaps between pulses of a pulse train generated as a function of motor speed, and a substantially constant time interval of a timing element.

BACKGROUND AND PRIOR ART

German Patent Disclosure Document DE-OS 26 08 611 discloses an arrangement in which pulses are derived from a tachometer generator whose frequency is proportional to the speed to be regulated, for example the speed of a spinning turbine. The cycle duration and the timing of the gaps between the pulses is inversely proportional to speed. The pulses trigger a flip-flop which produces pulses of a constant pulse length. The length of these pulses is compared with the cyclical duration of the tachometer pulses. Motor current is disconnected if the cyclical duration or duration of a period of the tachomater pulses is less than the constant pulse length; the motor current is connected again when the cyclical duration of the tachometer pulses becomes longer than the constant or reference pulse length. The control is a two-point, ON-OFF control in which the motor speed constantly varies or hunts about the desired value. The information which is contained in the tachometer pulse train regarding actual instantaneous motor speed is utilized only incompletely. U.S. Pat. No. 3,864,610 discloses an arrangement with a control circuit which has no 0 timing circuit with constant pulse length of its output.

THE INVENTION

It is an object to provide a speed control system, and more particularly a high-precision speed control system, in which actual speed pulses can be properly and effectively utilized to extract the information contained therein for a motor control, and in which the system is simple and is little influenced by tolerances of components used therein.

Briefly, a timing element, preferably a quartz-controlled counter, provides a constant timing period which is representative of a desired or command speed; a pulse train is produced having pulses, the gap between which is dependent on motor speed. The actual motor speed pulse train, or rather the gaps between the pulses, is compared with the timing interval to derive an error signal, the magnitude and sign of which is a characteristic of the divergence of the motor speed from the commanded value. The timing interval $T_s$ of the timing element is selected to be slightly less than the timing interval $T_i$ between two successive trigger pulses of the pulse train derived from the motor when the motor operates at the desired or commanded speed. A storage element, typically a capacitor, is charged during the time difference $\Delta T$ between the time interval $T_i$ of successive trigger pulses of the pulse train and the timing period $T_s$ of the command timing unit. The storage element is discharged at the end or elapse of the timing period, or at a predetermined time instant with respect thereto. The signal $u_{C1}$ at the storage element then will be a speed-dependent analog signal representative of a speed error at any instant of time.

The system effectively uses the information contained in the actual speed pulse train, is simple, and permits use of analog elements which, due to the arrangement, will be essentially immune to variations and tolerances in the components themselves, while providing for high precision of the control.

Use of a digital counter as the timing element, in accordance with an embodiment of the invention, is a particularly preferred embodiment. The digital counter provides a timing interval determined by the counter state which changes continuously as clock pulses are applied thereto. The counter state thus can change between predetermined values. The clock pulses are preferably applied by a quartz oscillator, providing high precision and high stability of the counting rate. A command frequency is thus easily provided on which the control can be based. The stability of such a control system approaches that of a phase locked loop (PLL). It has the advantage, however, of having a wide capture range and requiring but few components. PLL controls permit synchronization only if the deviation from the command speed is very small; they have a low capture range and thus require additional systems to permit start-up. Reference is made to U.S. Pat. No. 3,754,175, particularly FIG. 7, elements 101, 102, 105, 109, 110, illustrating such a system. The present invention permits elimination of these additional sub-systems and thus permits high precision speed control of even inexpensive mass-produced consumer goods requiring highly reliable maintenance of speeds with great precision, for example in audio use, for turntables, phonographs, tape recorders, and the like, to name only a few examples.

DRAWINGS

Illustrating preferred embodiments, in which

Parts which are similar or have the same operation will be referred to only once and have been assigned the same reference numerals.

FIG. 1 illustrates, in highly schematic form, a simplified embodiment of the present invention, the operation of which will best be understood by consideration of FIGS. 2 to 4 as well.

Figure 1:
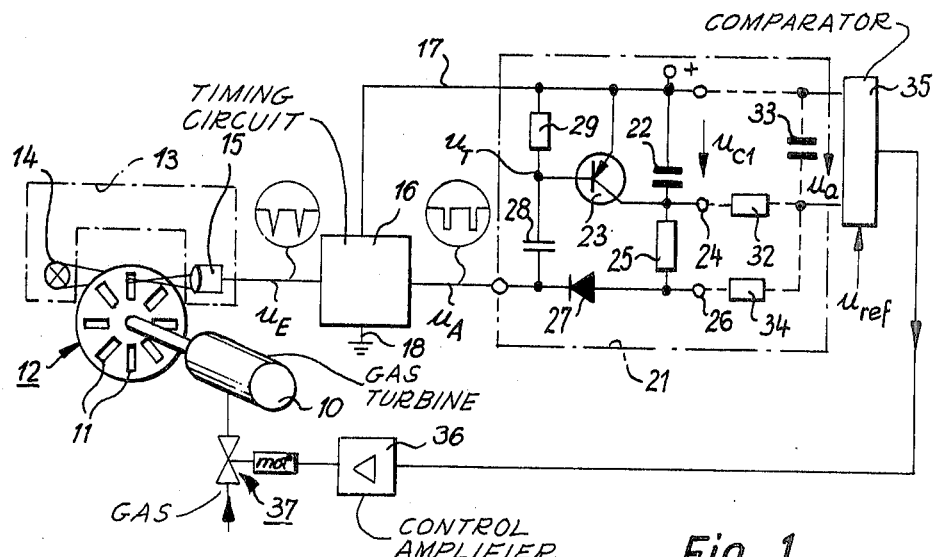
FIG. 1 is a diagrammatic representation for illustrating the basic principles of the invention.

The driving motor, the speed of which is to be controlled, is shown as a gas turbine 10. It is coupled to a rotation-pulse transducer here formed as a disk 12 which has eight equidistant slots 11 formed therein. A light source 14 shines light through the slots of the disk, to be picked up by a photoelectric pick-up 15, forming together a speed-dependent pulse source 13, providing output signals $u_E$ shown generally in FIG. 1 and, to a greater scale, in FIG. 2, line A. The pulses $u_E$ are applied to a timing element 16 responsive to trigger inputs. Timing element 16 provides output voltage $u_A$, of the shape shown in FIG. 1 and, to an enlarged scale, in FIG. 2, line B. At each trigger pulse $u_E$, an output voltage $u_A$ in the form of square wave pulses is provided, having a constant pulse duration $T_S$. The pulse duration $T_S$ is determined by the parameters of the timing element 16. This pulse duration $T_S$ can be adjustable in order to provide for exact command of a desired speed. The timing element 16 itself will be described in greater detail below; it is connected to positive and ground or reference supply buses 17, 18 of a d-c supply source, not shown.

Figure 2:
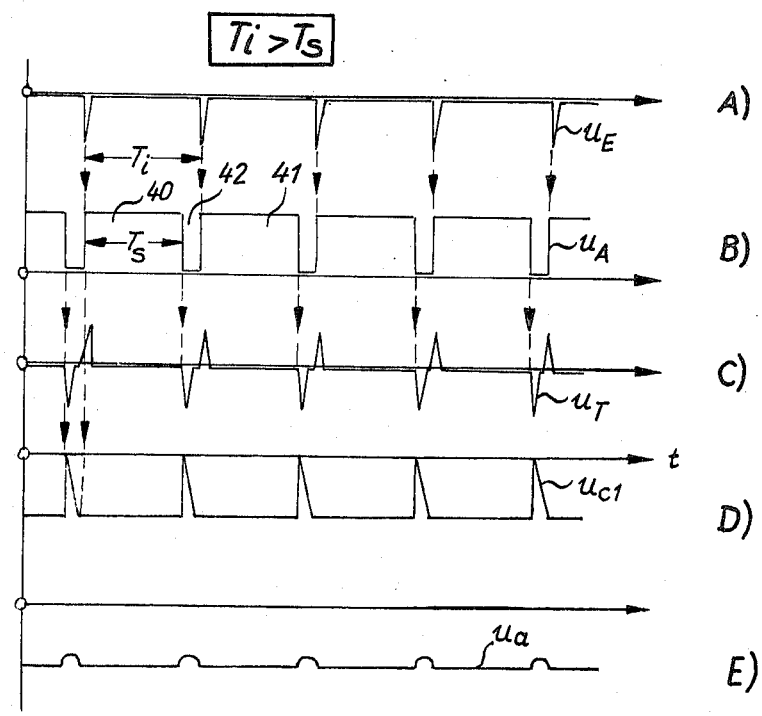
FIG. 2 are diagrams for illustrating the operation of FIG. 1.

The output pulses $u_A$—FIG. 2, line B, are applied to an evaluation circuit 21. Together with the timing element 16, evaluation circuit 21 forms a frequency/voltage translator circuit, that is, provides an output in form of an analog voltage representative of applied frequency. This frequency/voltage translating circuit has the particular feature that the translation is carried out only within a very narrow frequency range. The width of this range, as well as the center thereof, can be determined by design values. The further characteristic of this translating circuit is that the translation from frequency to voltage has a very steep transfer slope, that is, a very slight change in frequency will result in a large change in output voltage. The amplification of this translating circuit, with respect to change of input frequency, thus is very high.

The evaluation circuit 21 has a storage element, typically and in preferred form a capacitor 22. In operation, capacitor 22 has a voltage $u_{C1}$ applied thereto. This voltage is shown in FIG. 2, line C and, to an enlarged scale, in FIG. 3. One electrode or plate of the capacitor 22 is connected to the positive bus 17; the other is connected to the collector of a pnp transistor 23 which provides for periodic discharge of the capacitor 22. The other plate of the capacitor 22, further, is connected to an output terminal 24 and through a resistor 25 with an output terminal 26. The resistor 25 is additionally connected to the anode of a diode 27, the cathode of which is connected to the input to the evaluation circuit which also is the output of the timing element 16. The input to the evaluation circuit, which is also the cathode of diode 27, is connected through capacitor 28 with the base of transistor 23. A resistor 29 forms the base resistor for the transistor 23, connected to the positive bus 17. The emitter of transistor 23 is likewise connected to positive bus 17. The resistor 29 and the capacitor 28, together, form a differentiating circuit. The voltage $u_T$, shown in FIG. 2, graph C, appears at the junction between the capacitor 28 and the resistor 29.

The voltage $u_{C1}$ occurring on the condensor 22, in operation, has short-time instantaneous voltage peaks caused by the charge and discharge. These peaks are filtered by an R/C filter, formed by resistor 32 and capacitor 33 connected, as shown, with the capacitor 22 in form of a pi-network. A coupling resistor 34 is connected from output 26 to the junction between resistor 32 and capacitor 33, and forms one output of the unit 21.

In operation, capacitor 33 will have a filtered voltage $u_a$—FIG. 2, line E—appear thereat. This voltage, as well as a reference voltage $u_{ref}$, is applied to a comparator 35. The output from the comparator 35 then will be an error signal which is connected through a control amplifier 36 to an electrically controllable valve 37 which operates as a positioning valve controlling the supply of fuel, for example gas, to the turbine 10. The signal applied to the control valve 37 is such that, if the speed of the turbine should exceed a command speed, fuel is throttled; if the speed drops below command speed, additional fuel is supplied. The control is continuous, and an analog control, and not dependent on ON/OFF supplies to cause the turbine to hunt about a commanded average or mean speed.

The spacing between two trigger pulses derived from the transducer unit 13, shown at $T_i$ in FIG. 2, graph A, is inversely proportional to speed n of the turbine. As the speed increases, the pulses $u_E$ will be closer together, and the spacing of pulses, $T_i$, will decrease. The trigger pulses here considered are only those pulses which are of the polarity which can trigger the timing element 16. Pulses of incorrect polarity thus are not considered to be trigger pulses.

In accordance with a feature of the invention, the timing period $T_S$ or the timing interval of the element 16 is so selected that, at the desired speed of the motor 10, for example at 50 revolutions/second (3000 rpm), the time of the spacing between pulses, $T_i$, is just slightly greater than the time of the timing element 16, $T_S$. A suitable difference in length is, for example, in the order of a few percent of the time period of the element 16; for increased accuracy, and for severe requirements, this time may be substantially decreased and may be in the order of a few per mils, or even less, for example 1/1000.

Example: Let it be assumed that turbine 10 is to operate at 3000 rpm, and that disk 12 has eight slots as shown. This will result in $T_i = 1/400$ sec $= 2.50$ ms. $T_S$ then can be in the order of 2.49 ms. Two sequential pulses 40, 41 (FIG. 2—line B) then will have a pulse gap 42 of 0.01 ms.

The difference or width $\Delta I$ of the gap 42 will be: $\Delta T = T_i - T_S$.

The gaps 42 shown in line B of FIG. 2 are shown greatly exaggerated and enlarged since such small pulse gaps cannot be graphically reproduced, to scale, on a patent drawing.

Operation: Let it be assumed that capacitor 22 is discharged. When a pulse 40 appears at the output of timing element 16, diode 27 will block, and no change in charge of capacitor 22 will occur. During the pulse gap 42, the output of the timing element 16 becomes negative, diode 27 becomes conductive, and charge current can flow through resistor 25 to capacitor 22 to charge the capacitor. The polarity of the operating voltage between buses 17, 18 is so selected that the charge on the capacitor 22 at negative voltage—with respect to bus 17—will result so that the voltage at the junction 24 will become increasingly negative as the capacitor charges. The lower the speed, the more negative the voltage at the junction 24; if the speed increases, the voltage at junction 24 will be less negative.

The charge voltage $u_{C1}$ at the capacitor 22 will reach a value which is roughly proportional to the time interval $\Delta T$. As the speed increases, $\Delta T$ decreases, and $u_{C1}$, the charge voltage on the capacitor, likewise decreases. Consequently, the voltage at point 24 becomes relatively more positive. If the speed drops, however, $\Delta T$ becomes greater, the charge voltage $u_{C1}$ will increase and the voltage at the terminal 24 will drop or, rather, will become more negative.

As soon as a new pulse 40 is derived from the output of timing element 16, diode 27 will block and the charge is interrupted. The voltage at the capacitor 22 is stored, without change, during the duration of the new pulse 40, that is, during the timing interval $T_s$. At the end of the pulse 40, the trailing flank of the pulse is differentiated in the differentiating circuit 28, 29, provides a negative pulse $u_T$—FIG. 2, line C—which causes transistor 23 to suddenly become conductive. The transistor, now conductive, forms a short circuit for capacitor 22 and causes practically instantaneous discharge of the capacitor 22. The actual discharge time $t_E$—see FIG. 3—should be very short and may, for example, be in the order of hundredths (0.01) of $\Delta T$. The discharge circuit thus must be designed and dimensioned to have an extremely short time constant; capacitor 22 and the discharge circuit therefor must be laid out to be of low inductance and transistor 23 should have a high switching speed.

The charge cycle begins anew after discharge of the capacitor. The capacitor 22, functioning as a storage element, thus is discharged at each trigger pulse derived from the transducer 11, 12, 13 and recharged to a value representative of the then instantaneous speed. Thus, the speed is measured at each pulse derived from the tachometer transducer with high precision and thus optimally uses the information contained in the sequence of the series of pulses $u_E$. Additionally, the range of measurement can be held within predetermined restrictions.

Figure 4:
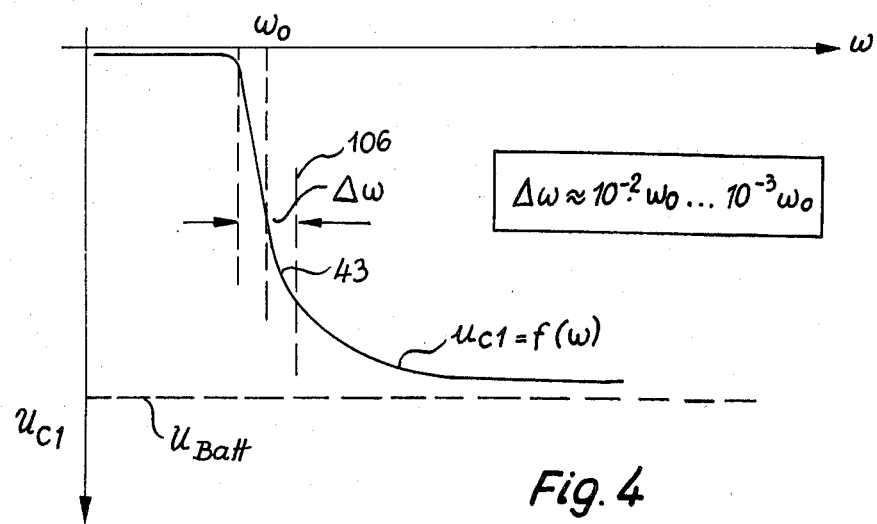
FIG. 4 is a representation illustrating the dependence of the output signal of the control device on the pulse train supplied.

FIG. 4 graphically illustrates the high transfer characteristic, or frequency-output amplification obtainable by the arrangement described. The voltage $u_{C1}$ is shown as a function of applied pulse frequency. Within a very narrow frequency spectrum, this voltage will have an analog value representative of speed, which permits continuous control within the frequency spectrum representative of this speed or, in other words, within this speed range or speed spectrum, and this is eminently suitable for high-precision control systems. Such systems are particularly useful in audio transducer drive systems, such as in phonographs, audio tape, and video tape systems. The arrangement is essentially immune to variations and tolerances of components within the analog portion, since the steep slope of the curve portion 43—FIG. 4—prevents that changes in the values or parameters of the components in the analog portion hardly influence the speed at all, from a practical point of view.

There is no superimposed or modulated undulation on the voltage of the capacitor 22 except for the short needle pulses of the duration $\Delta T$. These needle pulses primarily consist of harmonics of high frequency, and thus can be easily filtered by the R/C filter 32, 33. Resistor 34 is usually used, although not necessary, and, according to experience, is useful to suppress generation of any additional modulation or undesired waviness or undulation.

The output voltage $u_a$ at the filter capacitor 33 is illustrated in FIG. 2, graph E. The short time constant of the R/C filter 32, 33 does not have any noticeable influence on the reaction time of the gas turbine with respect to change in speed thereof; consequently, the control system reacts rapidly and is extremely sensitive to deviations from a desired or commanded speed.

Figure 3:
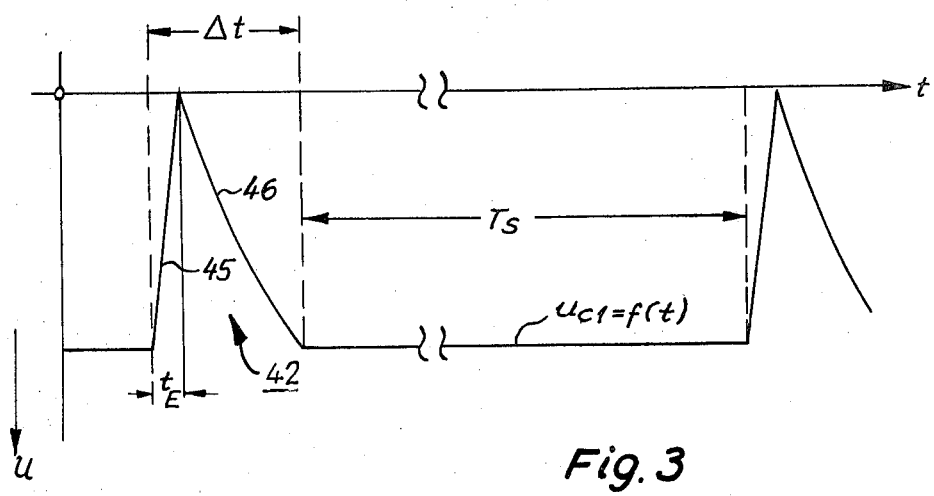
FIG. 3 is an enlarged representation of the curve shown in FIG. 2D.

The voltage across capacitor 22 is shown in FIG. 3 to a greatly enlarged scale. Discharge 45 is effected during the very short time $t_E$, as seen by curve 45. Thereafter, the capacitor is charged in accordance with the charge curve 46 with constant current. The timing interval $T_s$ then follows, during which the charge on the capacitor, $u_{C1}$, is maintained essentially constant.

The timing element 16 may be constructed in various ways. Particularly good results and excellent stability of frequency-voltage conversion of the translating system 16–21 is obtained by utilizing a quartz-controlled oscillator providing clock pulses to a counter.

Figure 5:
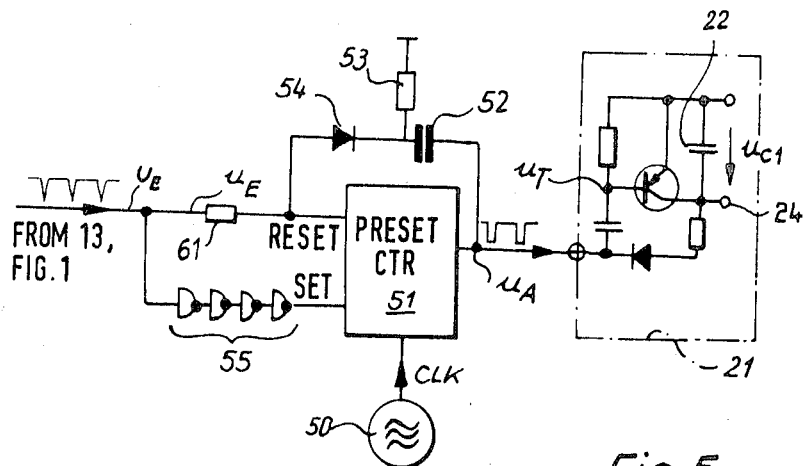
FIG. 5 is a variant of FIG. 1, which is particularly suitable for a so-called crystal control.

Timing circuit, FIG. 5: A quartz-controlled clock oscillator 50 provides clock pulses to a preset counter 51. Such a counter starts to count when receiving an input command pulse at the SET input terminal, and, at that instant, switches its output to a predetermined level, for example to a 1-signal level which may correspond to a value of "high", in the present example to essentially the value of the positive bus 17. This value is maintained during counting of the counter until a predetermined count state is reached. This predetermined count state can be adjustable, as well known in counter technology. As soon as the counter reaches its predetermined count state, for example its maximum count state, or any value therebelow, as determined by programming of the counter, the output of the counter 51 switches to "low" or to a 0-signal, for example at ground or reference voltage. A capacitor 52 and resistor 53 which, together with a diode 54, form a differentiating circuit, are connected to the output of counter 51 to feed back the output pulse and apply the output pulse to the RESET terminal of the counter 51 to reset the counter back to zero, or any desired and programmed starting value. The counter, thus, provides at its output square wave pulse $u_A$, having a timing duration $T_s$ which can be held with extreme precision for long periods of time. The precision of the timing interval is determined by the precision of the clock pulses derived from quartz generator 50.

The counter 51 is connected to receive pulses $u_E$ from the circuit 13 (FIG. 1) or any other suitable pulse source providing output pulses representative of rotary speed of the motor to be controlled. These pulses are applied directly to the RESET input of the counter 51; they are also applied to the SET input of the counter 51 through a delay line 55 formed of a plurality of inverter elements, for example four NOT circuits, as shown.

The output of the counter 51 is then connected to the evaluation circuit 21 which can be identical to that shown in FIG. 1 and illustrated in FIG. 5 only with the most important components thereof, in abbreviated form.

Figure 6:
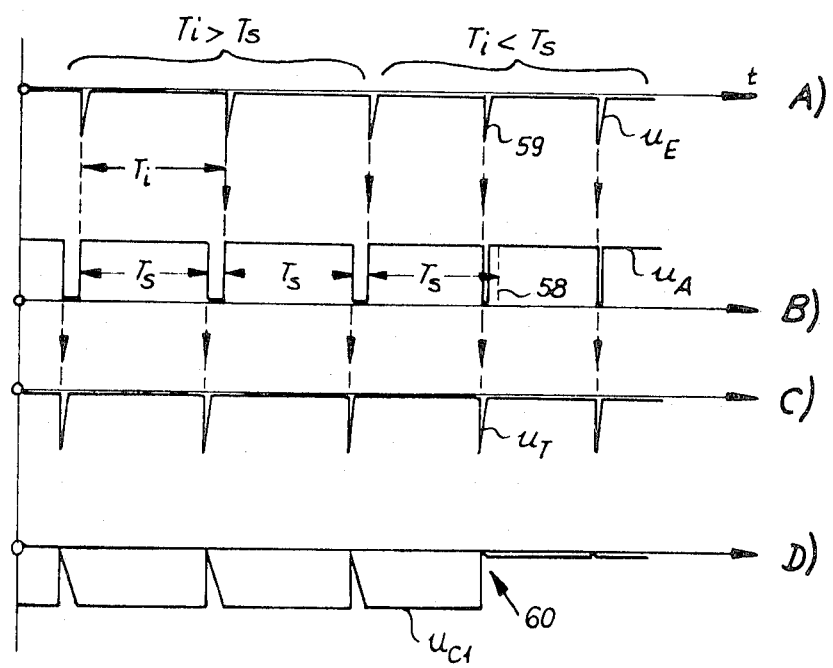
FIG. 6 are diagrams for illustrating the operation of FIG. 5.

Operation, circuit of FIG. 5, with reference to FIG. 6: FIG. 6 illustrates graphs for two conditions:

(a) if the pulse distance $T_i$ of the trigger pulses is greater than the pulse duration $T_s$ of the square wave pulses at the output of the counter—first two pulse gaps; and (b) if the pulse gaps between trigger pulses, $T_i$, are less than the pulse duration of the square wave output pulses of the counter 51—third and fourth pulses.

First case, $T_i$ is longer than $T_s$: the pulses $u_A$ terminate before a new pulse arrives—see FIG. 6, graph B. During the pulse gaps, capacitor 22 is charged to the voltage $u_{C1}$. If the speed exceeds the command value, a new trigger pulse would arrive while the counter 51 is still counting, see FIG. 6, graph B, third pulse, which shows the timing interval $T_s$ in broken line 58. The actual trigger pulse 59 is, temporally, in advance of the end of the timing period as illustrated by line 58.

To terminate counting, the trigger pulse is applied to the RESET input of the counter 51. Under ordinary counting operation, that is, when the turbine operates at the commanded speed, the pulse $u_E$ which resets the counter is ineffective since the counter already has been reset by the differentiated output pulse at the end of the preceding counting interval—compare end of pulse $T_s$ of the first two pulses. If, however, the speed has increased, so that the next trigger pulse comes before the counting cycle has been terminated, the counter is reset while the counter 51 is still counting. This, of course, shortens the output pulse $u_A$—see FIG. 6, graph B. Resistor 61 is used to decouple the trigger pulses and the RESET pulses derived from differentiating the output pulses.

The delay line 55 is used to supply the trigger pulse to the SET input of the counter 51 only with some delay so that a new counting cycle will start only after the counter has been reset. The time period between reset and retriggering of the counter is extremely short, and determined by the delay time of the delay line 55. This time is sufficiently short to permit discharge of the capacitor 22, but not charge of the capacitor 22 to a substantial charge level. The speed control system reacts accordingly and decreases the speed of the controlled motor. In FIG. 6, the line D shows this condition. Capacitor 22 will discharge during the short pulse gap since a pulse $u_T$ to control the discharge transistor 23 is obtained; there is no time, however, to effect charge of the capacitor 22 so that the output voltage $u_{C1}$ drops to a low level and will remain that low until the speed has dropped sufficiently. Expressed differently, the voltage at terminal 24 will then practically correspond to the voltage of the positive bus 17 and the evaluation circuit 21 will have a high output voltage.

Figure 7:
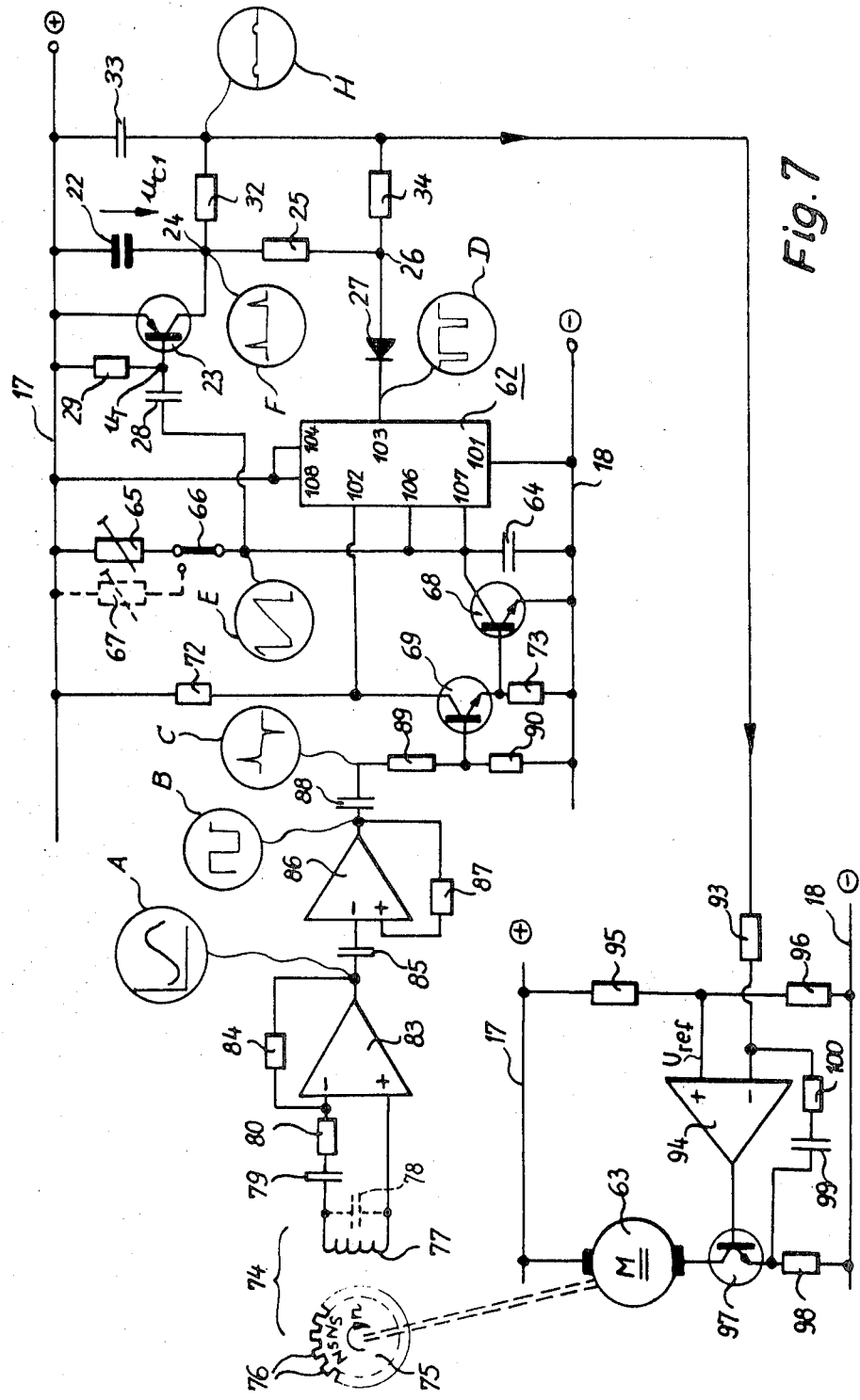
FIG. 7 is a third embodiment of the invention.

A complete circuit, in which the timing element is a monostable multivibrator (MMV) in integrated circuit form, is illustrated in FIG. 7. MMV 62 which, for example, is of the type MC 1455, is used. The notation 101-108 relates to the terminal connections of the IC MC 1455. The circuit of FIG. 7 is used to control the speed of a d-c motor 63 which is shown as a commutator-type motor, but which can also be a brushless d-c motor (see FIGS. 11 and 13 below).

The cathode of diode 27 is connected to the output 103 of IC 62; the terminal 101 is connected to reference bus 18, connections 104, 108 are connected to positive bus 17.

The timing period of the MMV 62 is determined by capacitor 64, connected between reference bus 18 and input 107, as well as by a controllable resistor 65 connected between positive bus 17 and terminal 106. Terminals 106 and 107 are interconnected. A different speed range can be selected by a transfer switch 66 which, for example, can switch over the resistor 65 to another resistor 67 which, likewise, is adjustable. Thus, switch 66 can be used for selection, with very high accuracy, of various speed ranges as determined by the number of resistors 65, 67 . . . which are connected in circuit with terminals 106, 107 of MMV 62. That electrode of capacitor 28 $<->$ is also connected to the terminals 106, 107 $<$ which is remote from the base of transistor 23$>$. The discharge of capacitor 22, controlled by resistor 23, is controlled by voltage change of the timing capacitor 64. A further discharge circuit is associated with capacitor 64. This further discharge circuit is an npn transistor 68, having its main current carrying path, that is, the emitter-collector path, connected in parallel to capacitor 64. The trigger input 102 of the IC 62 is connected to the collector of an npn transistor 69 which is connected through resistor 72 with positive bus 17 and has its emitter connected through resistor 73 to negative bus 18. The emitter of transistor 69 is additionally connected to the base of transistor 68.

A tacho-generator 74 is connected to motor 63. Tacho-generator 74 has a permanent magnet rotor 75 with a plurality of alternately polarized teeth 76 which, upon rotation of rotor 75, induce an approximately sine wave voltage in coil 77. Let it be assumed that motor 63 is a direct-drive phonograph or turntable motor. Motor 63 then should be controlled to have $33\frac{1}{3}$ rpm. The rotor 75, suitably, will have 400 teeth. With such a rotor, 111 pulses per second are obtained so that, within one revolution of motor 63, the speed control circuit will receive information regarding the then actual instantaneous speed 200 times and the control circuit can correct any deviation from the commanded value of $33\frac{1}{3}$ rpm 200 times during any one revolution.

A capacitor 78 is preferably connected in parallel to the coil 77 to suppress noise pulses. Capacitor 79 and resistor 80 provide coupling elements to transfer the voltage of coil 77 to the two inputs of an operational amplifier 83. Operational amplifier 83 has a resistor feedback circuit with resistor 84 to provide for essentially linear amplification. The output voltage from operational amplifier 83 is coupled through coupling capacitor 85 to the inverting input of an operational amplifier 86 which has a positive feedback resistor 87 connected thereto so that the incoming sine voltage is transferred at its output into a square wave voltage. This square wave voltage, with extremely steep flanks, is differentiated by differentiating circuit 88, 89, 90 and connected to the base of transistor 69. Wave shapes occurring in the circuit are shown within circles and lettered similarly to the lettered graphs of FIG. 8 (graphs A-F) and graphs D and E of FIG. 2 shown in circles F, H of FIG. 7.

The filtered output voltage on filter capacitor 33 is applied over a coupling resistor 93 to the inverting input of operational amplifier 94, the positive input of which is connected to a tap point of the voltage divider formed by resistors 95, 96 and is connected across the supply buses 17, 18. In this embodiment, as in the others, the voltage between buses 17, 18 preferably is a controlled, closely regulated voltage maintained at a constant level. The output of the operational amplifier 94 is connected to the base of an npn power transistor 97, the emitter of which is connected over a resistor 98 to negative bus 18; the collector is connected to the motor 63 and, through the motor, to positive bus 17. The controller should have proportional-integrating characteristics, and in order to provide for such characteristics, the inverting input of the operational amplifier 94 is connected to the junction between the emitter of transistor 97 and resistor 98 through a capacitor-resistor coupling 99, 100.

Figure 8:
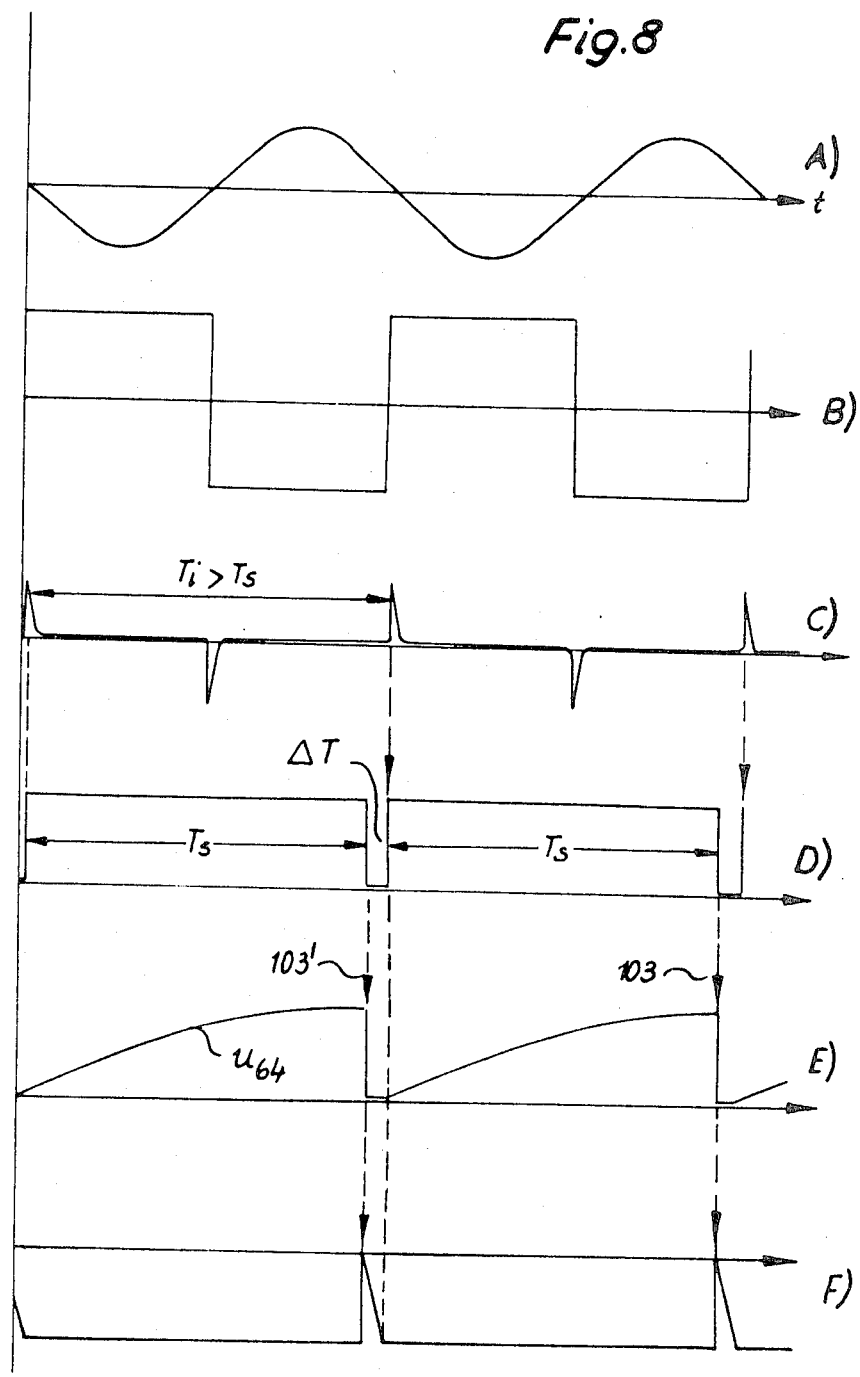
FIGS. 8 and 9 are two representations with diagrams for illustrating the operation of the control arrangement of FIG. 7.

Operation, with reference to the oscillograms A-H of FIGS. 7 and 8: Tacho-generator 74 provides an output which is linearly amplified in amplifier 83 and provides at the output of operational amplifier 86 a square wave signal which is differentiated before being applied to the input of transistor 69. The positive signals—FIG. 8, graph C, and FIG. 9, graph C, are inverted by transistor 69 and trigger the IC 62 and provide pulses at the output 103 shown in graph D, FIGS. 8 and 9, having a pulse length $T_s$, determined by the values of the capacitor 64 and resistor 65. The voltage rise on capacitor 64 during any one pulse is shown in the graph E of FIG. 8. After the end of a pulse, that is, after elapse of the period $T_s$, IC 62 effects, internally, a connection between terminals 101 and 107. This internal connection causes sudden discharge of the capacitor 64, as symbolized in FIG. 8 by the arrow 103′. This sudden jump in voltage $u_{64}$ at the capacitor 64 is differentiated by capacitor 28 and resistor 29 and causes transistor 63 to be conductive for a short time interval, thereby discharging capacitor 22 functioning as a storage element. Exactly as described in FIG. 1, capacitor 22 is charged over diode 27 and resistor 25 during the gap between the two pulses, based on connection of the capacitor 22 to the terminal 103 through the then conductive diode 27. The voltage which the capacitor 22 will reach will depend on the length of the gap between pulses; as the speed increases, this gap between pulses will become less, and thus the voltage will become less. This voltage value, stored on capacitor 22, is maintained thereon during the entire period of the subsequent pulse, that is, is available at output 103 and is provided as information with respect to actual speed during that pulse to the motor 63 through the operational amplifier 94. Operational amplifier 94 compares this information with the reference voltage applied thereto from the tap point of the voltage divider 95, 96, forming a reference voltage at its direct input and thus either increases or decreases the current through transistor 97 to suitably control the motor.

The graph of FIG. 8 illustrates the condition in which the motor speed is not higher than the desired or command speed, that is, $T_i$ is longer than $T_s$, so that a pulse gap $\Delta T$ will result. If the motor speed increases above the desired value, $T_i$ becomes less than $T_s$, a condition which will be explained in connection with the graphs of FIG. 9. Internal reset of IC 62 will then no longer be effective since the IC 62 would be continuously triggered by the more rapidly sequential positive pulses, as illustrated in graph C of FIG. 9. Graphs A and B of FIG. 9 would be identical to those of FIG. 8 and have been omitted for clarity. Eventually, the timing period determined by IC 62 in combination with its timing circuit, $T_s$, may become longer than $T_i$ and the IC will be triggered even before the timing period $T_s$ has terminated. Thus, no pulse gap at the output 103 will result, the output remains constantly "high", that is positive, diode 27 will block and, when using the arrangement in accordance with FIG. 1 alone, capacitor 22 would retain the last-stored charge and the controller would have simulated therein a speed which is too low, so that the motor 63 would receive current continuously and would run to a high speed.

Figure 9:
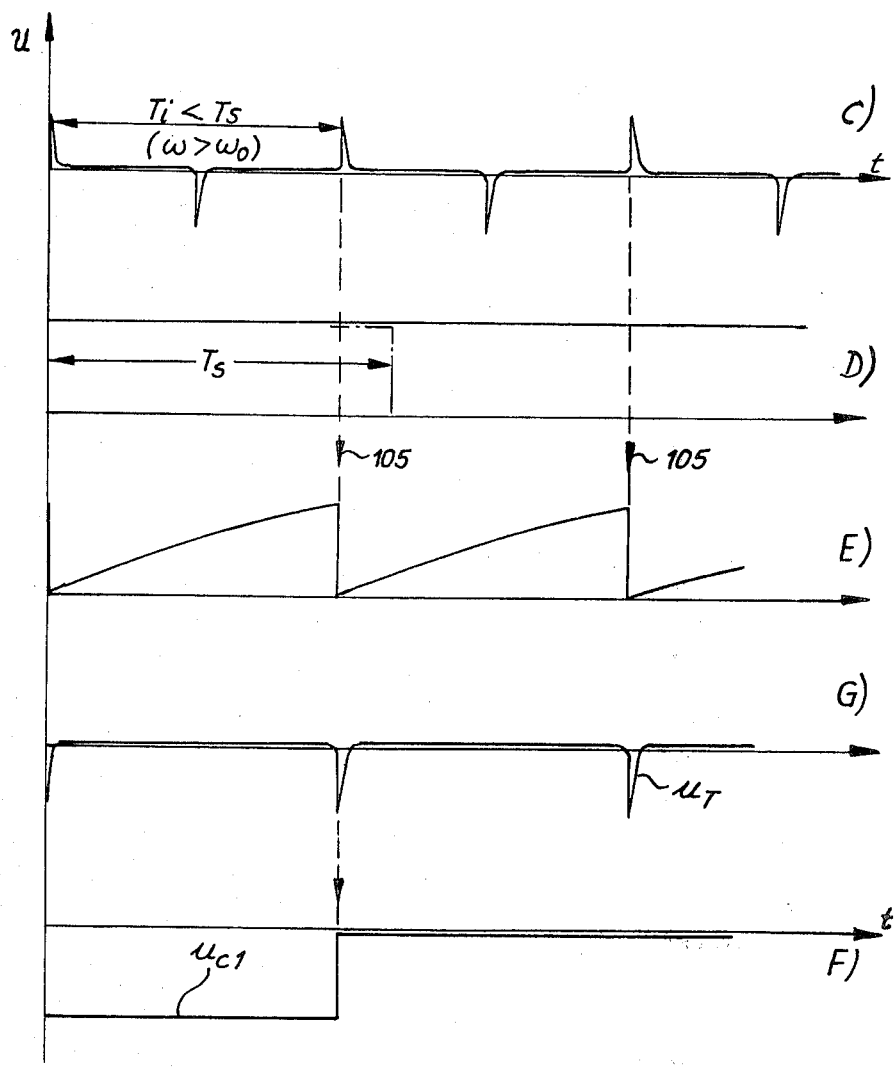

Transistor 68 is provided in the circuit of FIG. 7 to prevent such spurious control effect. Each positive trigger pulse—see FIG. 9, graph C—causes transistor 68 to be conductive for a short period of time—by transfer of the pulse through transistor 69—and thus discharge of capacitor 64. These positive pulses are positive at the junction between capacitor 88 and resistor 89. Lines 105—FIG. 9—symbolize those positive trigger pulses. Thus, even if the speed is too high, capacitor 64 is continuously discharged and recharged in accordance with a sawtooth wave—see FIG. 9, graph E. Upon each discharge of capacitor 64, emitter current is applied to the transistor 23 through the differentiator 28, 29 for a short instant of time, which causes transistor 23 to become conductive and short-circuit capacitor 22. Diode 27—as described—remains continuously blocked. Thus, capacitor 22 cannot be recharged until the speed has dropped so that it is below the upper speed limit indicated in FIG. 4 at the upper level 106. FIG. 9, graph F, is an exaggerated representation of the decrease in the signal $u_{C1}$ when the threshold level 106 is exceeded. This condition may arise if, upon starting, the motor increases its speed above the desired running speed. A similar condition may obtain if the motor speed is switched from a lower to a higher speed, for example in a phonograph or turntable motor from 33⅓ rpm to 45 rpm; or when the motor has been operating at a higher speed, e.g. 45 rpm and is then commanded to operate at a lower speed, e.g. 33Δ rpm.

Figure 10:
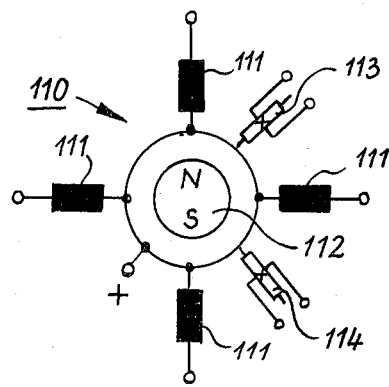
FIGS. 10 and 11 are the representation of a four-winding, four-pulse brushless d.c. motor in its interaction with the circuits according to the preceding embodiments.
Figure 11:
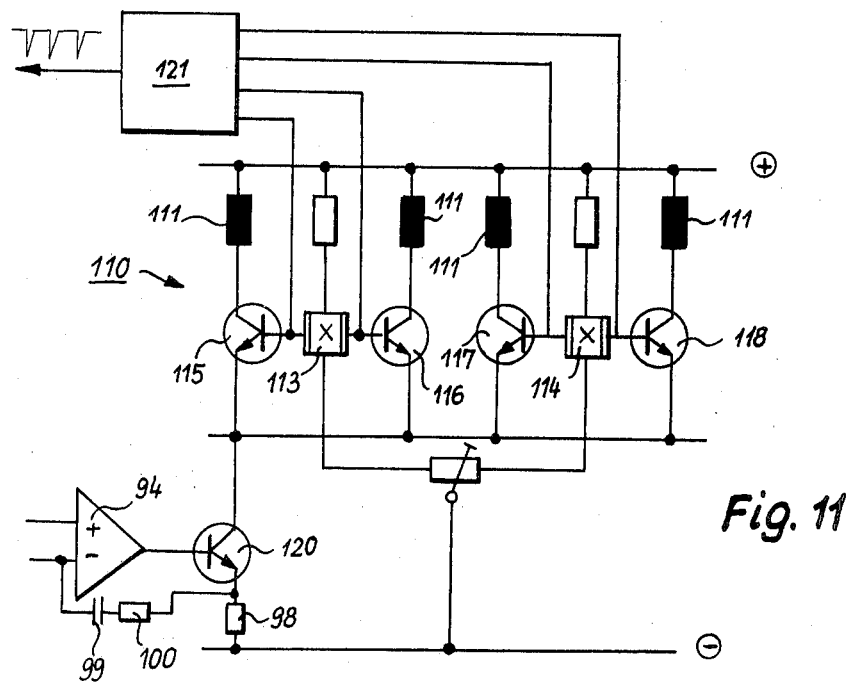

The system of the present invention is applicable to brushless d-c motors and various other apparatus. FIGS. 10 and 11 illustrate an application of the present invention to a four-pulse, four-winding brushless d-c motor 110, shown only in highly schematic representation. Such motors are described in the literature, see, for example, German Patent Disclosure Document DE-OS 24 24 290, assigned to the assignee of the present application, and specifically FIG. 17 thereof. Briefly, such a motor has a star-connected stator winding with four winding coils 111, offset with respect to each other by 90°-electrical, and a two-pole permanent magnet rotor 112. Two Hall generators 113, 114 are provided, located on a stator and 90°-el. offset with respect to each other. The four windings are, respectively, supplied by four associated power transistors 115, 116, 117, 118 (FIG. 11) which have their emitters respectively connected to a common bus and, as such, to the collector of a common control transistor 120. Control transistor 120 corresponds or is similar to transistor 97 (FIG. 7) and operates similarly, controlled by operational amplifier 94. A brushless motor 110, can be controlled similarly to the brush-type motor 63 of FIG. 7.

The Hall generators 113, 114 are provided to control current flow through the respective transistors 115-118 to provide for electronic commutation between the respective windings 111. These Hall generators 113, 114 can, in accordance with a feature of the invention, be additionally utilized to provide a speed-dependent voltage without requiring the transducer 74, FIG. 7. The signals derived from the Hall generators 113, 114 are connected to an evaluation circuit 121 which receives the signals from the Hall generators and provides a pulse sequence having pulse gaps which are inversely proportional to the speed of the motor 110.

Figure 12:
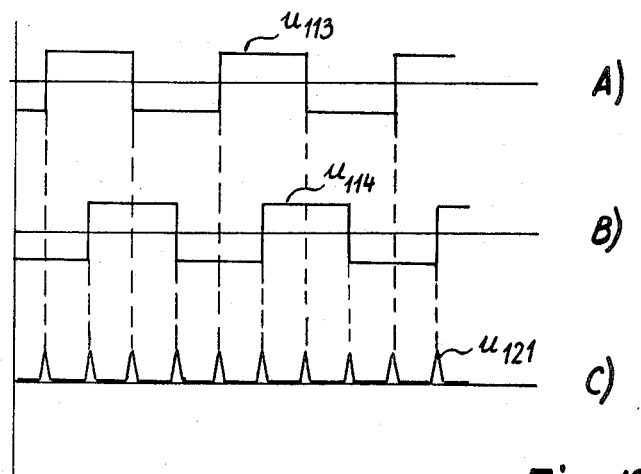
FIG. 12 are diagrams for explaining the operation of FIG. 11.

Operation, FIGS. 10, 11, evaluation circuit 121, with reference to FIG. 12: Graph A of FIG. 12 shows the output voltage $u_{113}$ of Hall generator 113; graph B of FIG. 12 shows the output voltage $u_{114}$ of the Hall generator 114. Evaluation circuit 121 senses the voltage jumps of these two voltages and provides in their stead a pulse sequence $u_{121}$ which can be applied to the control circuit of FIG. 7, for example at the point forming the output of the operational amplifier 86 (FIG. 7), thus eliminating additionally the components 74–87. These pulses are then introduced, preferably, at the junction between the capacitor 88 and resistor 89. The pulses of graph C of FIG. 12 can be obtained, for example, by amplification and differentiation.

The circuit of the present invention can be used also in combination with different types of motors, for example a two-pulse, two-winding brushless d-c motor 125. Such a motor is described in U.S. Pat. No. 4,119,895, by the inventor hereof and assigned to the assignee of the present application. Reference is also made to the referenced publications and patents of U.S. Pat. No. 4,119,895. Briefly, such a motor has two stator windings 126, 127 alternately supplied with current over two power transistors 128, 129 which, in operation, generate an alternating fluctuating field. The permanent magnet rotor has been omitted from FIG. 13 for clarity. The rotor will induce an approximately sine-wave voltage in that one of the windings which does not carry current—see FIG. 14, graph A, showing the voltage on the winding 126 at $u_{126}$, and the voltage on the winding 127 at $u_{127}$. These voltages are applied over diodes 132, 133 to an evaluation circuit 134 which senses when the voltages pass through zero or a reference level and generates a pulse sequence $u_{134}$—see graph B of FIG. 14. This voltage $u_{134}$ is applied to the control system similarly to the pulse sequence $u_{121}$ of graph C, FIG. 12, that is, for example to the junction between capacitor 88 and resistor 89 of the circuit of FIG. 7. The evaluation circuit itself is described in the aforementioned U.S. Pat. No. 4,119,895 in detail, and reference is made thereto. The transistors 128, 129 shown in FIG. 13 are controlled by a Hall generator 130.

Figure 13:
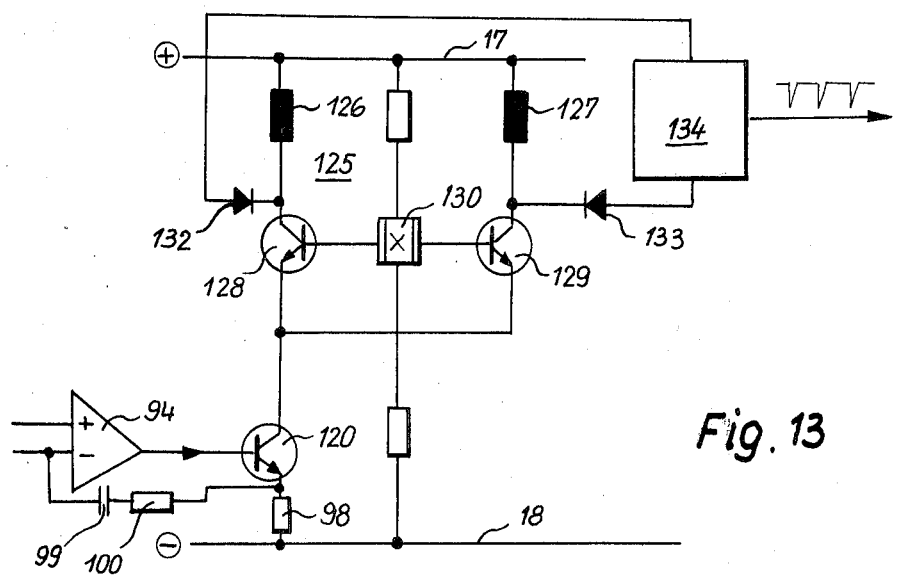
FIG. 13 is the representation of a two-winding, two-pulse brushless d.c. motor in its interaction with the circuits according to the preceding embodiments.
Figure 14:
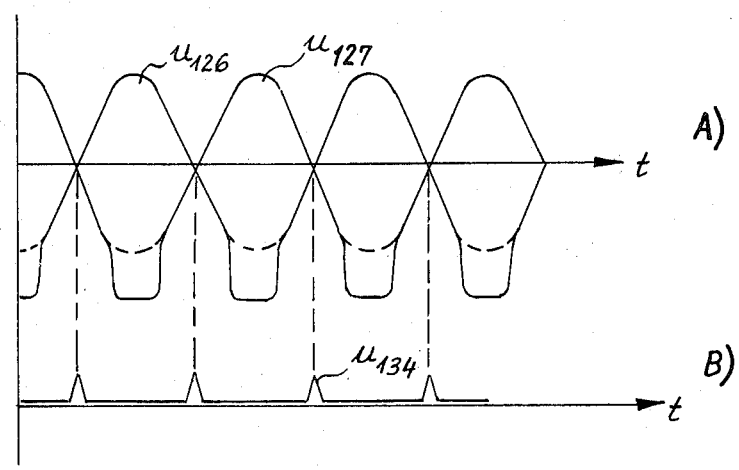
FIG. 14 are diagrams for explaining the operation of FIG. 13.

Control transistor 120—FIG. 13—and operating similarly to control transistor 120 of FIG. 11 controls current flow through the power transistors 128, 129, respectively. Transistor 120 operates as a control element controlling the supply of energy to the respective coils 126, 127 in accordance with the relative switching states of the transistors 128, 129, which operate as steering transistors. In all other respects, the circuit operates similarly to that of FIG. 7, transistor 120 corresponding to transistor 97 thereto.

The pulse generating circuits of FIGS. 11 and 13 are particularly suitable for higher speeds. At lower speeds, a tacho-generator is preferred, since a tacho-generator can be constructed to provide a large number of pulses for any one revolution of the driving element, typically an electric motor. The advantages of the invention are best utilized when the pulse frequency is higher, since the maintenance of the constant speed over an entire revolution of the motor is optimized.

The voltage of the positive bus 17 is directly applied to one of the terminals or plates of the capacitor 22. By connecting one electrode of the capacitor 22 directly to the voltage of the positive bus, the voltage at point or terminal 24 (FIG. 1) will rise if the speed increases and will become more negative or drop at dropping speed. This voltage, therefore, as illustrated in connection with FIG. 7, can then be directly applied to the amplifier 94 to block amplifier 94 if the speed becomes too high. The voltage on capacitor 22, thus, does not function directly as a control signal; rather, it is the difference between this voltage and the voltage between lines 17, 18 which provides the control signal. This control signal, if desired, can be filtered or smoothed by the filter network formed by capacitors 32, 33, which are desirable but not strictly necessary, and therefore are shown in broken lines in FIG. 1. The comparator 35 (FIG. 1) is represented in FIG. 7 by the operational amplifier 94 connected to the reference tap of voltage divider 95, 96, which may well be a variable voltage. Since the reference supply to the operational amplifier 94, determined by the voltage divider 95, 96 is the same as the reference supplied to the capacitor 22, minor voltage variations are inherently balanced out.

Various changes and modifications may be made, and features described in connection with any one of the embodiments may be used with any of the others, within the scope of the inventive concept.

I claim:

1. Speed control system for a motor (10, 63, 110, 125) having a controlled energy supply (37, 97, 120);

speed signal generating means (11-15;75-86; 121; 132; 133, 134) providing a series of speed needle pulses ($u_E$) having a repetition rate representative of speed of rotation of the motor;

a commanded timing element (16, 51, 62) providing a pulse train forming a characteristic representative of a commanded speed and furnishing a sequence of essentially square wave output pulses ($u_E$) of a controlled pulse length ($T_S$) separated by controlled pulse gaps in which, when the motor is operating at essentially the commanded speed, the controlled length of the pulses is just slightly shorter than the recurrence time interval ($T_i$) of the speed needle pulses and in which the pulse gaps between the pulses have a width such that the needle pulses fall within said pulse gaps;

a storage element (22);

charge means (17, 25, 27) connected to and charging said storage element (22) at a predetermined rate during the difference ($\Delta T$) between said recurrence time interval ($T_i$) of the needle pulses ($u_E$) and said pulse length of the essentially square wave output pulses ($u_A$);

discharge means (23) connected to and discharging said storage element after elapse of at least a portion of the time period ($T_s$) of the pulse ($u_A$) of the control pulse length;

speed error signal generating means (35, 94) generating a control signal, connected to and controlled by the charge on said storage element and having an output controlling said controlled energy supply as function of deviation of actual essentially instantaneous motor speed from commanded motor speed, and comprising, in accordance with the invention an override discharge circuit (55, 61, 68) connected to and responsive to said speed needle pulses ($u_E$) and connected to and controlling said commanded timing element (16, 51, 62) to reset said timing element to provide a new pulse train and, further, to discharge said storage element (22)

to prevent simulation of a low-speed condition if the difference between actual speed and commanded speed is substantial.

2. System according to claim 11 wherein said timing circuit (16, 51, 62) comprises a monostable multivibrator (62) including a timing capacitor (64) to determine the timing intervals thereof;

and wherein the override discharge circuit includes a separate controlled discharge switch (68) connected to said timing capacitor (64), said control discharge switch being connected to and controlled by the speed needle pulses ($u_E$) to discharge said timing capacitor and terminate the timing interval, and hence the pulse length ($T_s$) upon occurrence of the subsequent speed needle pulse.

3. System according to claim 2, wherein the storage element (22) comprises a capacitor connected to the output of the monostable multivibrator (62), the discharge means comprises a low inductance, rapid-acting discharge circuit (23) connected to the capacitor;

and wherein the discharge circuit is connected to and controlled by the charge on the timing capacitor (64) of the multivibrator (62).

4. System according to claim 30, wherein the storage element (22) comprises a capacitor;

and a differentiating circuit (28, 29) is provided, connected to the monostable multivibrator (62) and controlling the discharge means (23) for said storage capacitor (22).

5. System according to claim 4, wherein the differentiating circuit (28, 29) is connected to the timing capacitor (64) of the monostable multivibrator (62) and additionally controls the discharge of the capacitor (22) forming the storage element.

6. System according to claim 2, wherein said monostable multivibrator (62) comprises an integrated circuit (IC) and includes a discharge circuit, forming said discharge means, internally thereof for said timing capacitor (64);

and wherein said separate controlled discharge switch (68) is provided as an element additional to the internal discharge circuit.

7. System according claim 11, wherein the commanded timing element is a digital counter (51);

a clock pulse source (50) is provided, supplying clock pulses (CLK) to the counter, the time of counting of the counter to a predetermined value determining the pulse length ($T_s$) of said essentially square wave output pulses;

and wherein the override discharge circuit comprises means (61, 55) to connect the speed needle pulses ($u_E$) to the reset input (RESET) of the counter without delay, and to apply the speed needle pulses ($u_E$) to the set input (SET) with delay.

8. System according to claim 11, wherein the length of the pulse gaps ($\Delta T$) is in the order of magnitude of a few percent of the duration of the controlled length of the pulses ($T_s$).

9. System according to claim 11, wherein the length of the pulse gaps ($\Delta T$) is in the order of magnitude of at most a few per mils of the length ($T_s$) of the essentially square wave pulses.

10. System according to claim 11, wherein the discharge means (23) is a short-time, low-inductance discharge circuit which discharges said storage element (22) in a period of time which is at most a few percent of the duration of the pulse gaps ($\Delta T$).

11. System according to claim 11, wherein the length of the pulse gaps ($\Delta T$) is in the order of magnitude of a few percent of the duration of the controlled length of the pulses ($T_s$);

and wherein the discharge means (23) is a short-time, low-inductance discharge circuit which discharges said storage element (22) in a period of time which is at most a few percent of the duration of the pulse gaps ($\Delta T$).

12. System according to claim 7, wherein said clock source providing the clock pulses (CLK) is a quartz-controlled oscillator (50).

13. System according to claim 11, wherein (FIG. 7) said commanded timing element comprises an analog timing circuit (62).

14. System according to claim 2, wherein (FIG. 8D) said monostable multivibrator (62) comprises an integrated circuit.

15. System according to claim 2, further including a common trigger circuit (69, 88, 89) connected to trigger said monostable multivibrator and additionally said override discharge circuit.

16. System according to claim 2, wherein the storage element (22) comprises a capacitor;

and the charge means include a charge resistor and a diode (27) serially connected between the output of the monostable multivibrator (62) and said capacitor (22).

17. System according to claim 11, wherein the storage element (22) comprises a capacitor;

and a filter circuit (32, 33) is connected to the capacitor to provide for filtering of the charge and discharge voltages and voltage peaks occurring at the terminals of the capacitor during charging and discharging.

18. System according to claim 17, wherein the filter is an R/C filter (32, 33) connected to form, together with the capacitor (22), a pi-circuit;

a charge control resistor (25) connected to one terminal of the capacitor (25);

and a filter resistor (34) connected to the charge control resistor (25) at the terminal remote from its connection to the capacitor (22) and further connected to the output of the filter circuit, to provide for an essentially constant voltage at the output of the filter circuit in the interval between charge and discharge of the capacitor (22).

19. System according to claim 11, wherein (FIGS. 7–13) the speed error signal generating means (94) comprises a comparator having proportional-integrating characteristics and providing an output signal controlling said controlled energy supply.

20. System according to claim 11, wherein (FIG. 7) said speed signal generating means comprises a tacho-generator (74) and wave shaping stages (83, 86) connected to the output of the tacho-generator to provide said series of speed needle pulses ($u_E$).

21. System according to claim 11, wherein (FIG. 11) the motor is an electric motor, and includes means (113, 114) providing output signals representative of position of the rotor of said motor;

and an evaluation circuit (121) connected to said rotor position signal generating means and providing said series of speed needle pulses.

22. System according to claim 21, wherein said motor is a brushless d-c motor, and said rotor position generating means comprises magnetic field responsive means (113, 114) positioned to respond to the field generated by the rotor upon rotation thereof.

23. System according to claim 11, wherein (FIG. 13) the motor is a brushless d-c motor having means (132, 133) sensing a characteristic of voltages induced in the windings thereof upon rotation of the rotor field;

and an evaluation circuit (134) connected to said voltage characteristics sensing means and furnishing said speed needle pulses.

24. System according to claim 23, wherein said motor has motor windings which, during some time in the operation of the motor, are disconnected from current supply;

and said voltage characteristic sensing means (132, 133) sense the passage through zero or null of the voltages induced in the current-less windings.

25. System according to claim 11, wherein the storage element (22) comprises a storage capacitor and wherein said speed signal ($u_{C1}$) appears across the electrodes thereof;

said capacitor having a first terminal (24) which is connected to have a voltage thereacross which increases with increasing speed of the motor.

26. System according to claim 25, wherein the capacitor (22) has a second terminal;

a controlled voltage (17) connected to said second terminal, the voltage at the first terminal (24) varying and providing said control signal.

27. System according to claim 11, wherein the storage element comprises a capacitor 22;

a source of controlled or reference voltage (17, 18) connected to one terminal (24) of the capacitor, the other terminal of the capacitor having a voltage appear thereat determined by the charge state thereof as controlled by the duration of connection of said charge means to the capacitor, the speed signal ($u_{C1}$) being the difference between the controlled or reference voltage and the charge state or charge voltage across said capacitor.

* * * * *